March 11, 1930.                A. L. SCHOEN                1,750,197
HEAT ELIMINATION SCREEN FOR PROJECTOR SYSTEMS Filed Dec. 8, 1926

INVENTOR,
Arthur L. Schoen,
BY
ATTORNEYS.

Patented Mar. 11, 1930

1,750,197

UNITED STATES PATENT OFFICE

ARTHUR L. SCHOEN, OF ROCHESTER, NEW YORK, ASSIGNOR TO EASTMAN KODAK COMPANY, OF ROCHESTER, NEW YORK, A CORPORATION OF NEW YORK

HEAT-ELIMINATION SCREEN FOR PROJECTOR SYSTEMS

Application filed December 8, 1926. Serial No. 153,314.

This invention relates to projector systems, and particularly to such systems as are intended for the projection of images from transparent supports which are deleteriously affected by heat.

It has long been known that a thin film of gold has materially higher reflective powers for heat rays than for light rays and also transmits a greater proportion of light rays than of heat rays.

It has been necessary, in order to utilize this known property in projection systems, to coat the gold film upon a support of glass or glass-like substance. This has several objections. Glass is a highly frangible substance and is seldom, if ever, so heat resistant as to withstand for long periods the conditions found in a projection system. Moreover, glass is a very poor heat conductor and this fault is aggravated by the fact that the glass, by reason of its high frangibility, must be rather thick in order to be used at all. The heat dissipation, even under the most favorable conditions, is so low that a piece of glass in the beam becomes hotter and hotter and becomes a source of radiant heat, even if it does not crack.

I have discovered that mica, occurring naturally in thin sheets of sufficient size, makes a highly satisfactory support for this purpose. While the transmitting properties of the natural product varies, there is readily obtainable on the market a supply of uncolored or clear mica having a sufficiently high transparency for the use here described. While the coefficient of expansion under heat is practically identical with that of ordinary glass, the mica sheets are not injuriously affected in any way and do not crack at temperatures occurring even after long continuous use in the beam of an ordinary projection lantern or motion picture projector. The absorption of heat rays by mica is of the same order as by ordinary glass. However, because of its non-frangibility, it can be used in exceedingly thin layers that have a minimum absorption of light and heat and are readily cooled, so that the sheet of mica does not become highly heated and does not store up heat sufficient to become a source of radiant heat. Because the heat is so readily dissipated, it is not usually necessary to drive air across the screen but provision for this may be made. Even in thin sheets, it must be submitted to considerable bending stress before it will crack or break. Sheets can be dropped with impunity and otherwise submitted to rough handling such as would be quite impossible with glass.

Reference will now be made to the accompanying drawing, wherein

Figure 1:
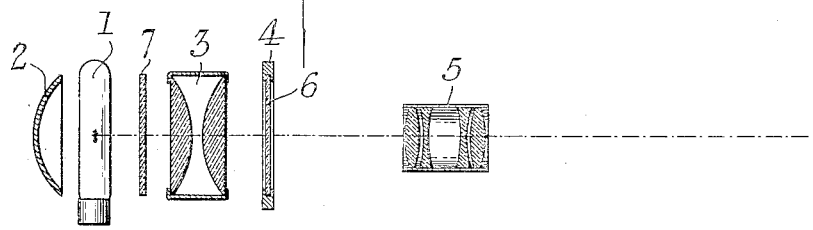
Fig. 1 is a diagram of an optical projection system embodying my invention.

The projection system may comprise a source of light 1, such as an incandescent lamp, with the usual reflector 2, condenser 3, projection window 4 and objective 5. At the window is shown an image-bearing slide or film 6, of a material that is deleteriously affected by heat, such, for instance, as a film of pyroxylin or other cellulosic support, such as a composition including cellulose acetate, cellulose ether or viscose, and having an image-bearing layer such as a gelatine layer with a silver photographic image therein.

Positioned at any convenient point between the light and the film gate is my improved heat absorbing screen 7. It is here shown as between the lamp and the condenser.

Figure 2:
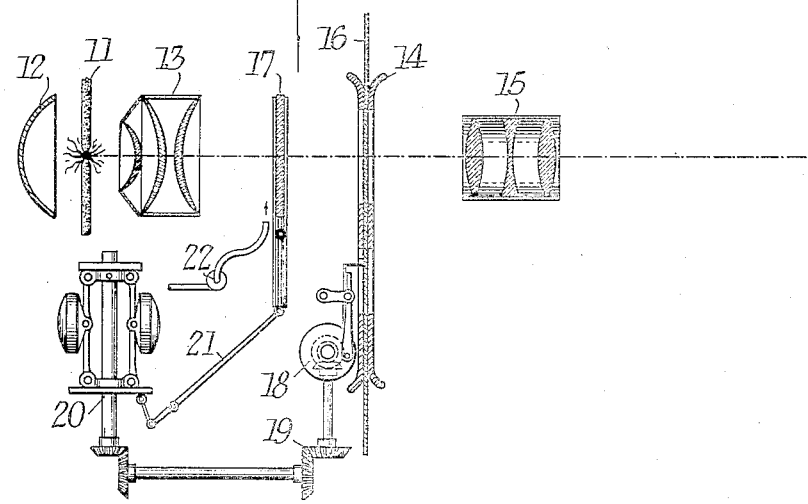
Fig. 2 is a diagrammatic showing of a motion picture projector embodying my invention.
Figure 3:
Fig. 3 is a section on a magnified scale of my improved screen.

In Fig. 2 are shown a source of light 11, such as an arc, reflector 12, condenser 13, projection gate 14 and objective 15. Adapted to be moved through the gate is a motion picture film 16 of usual character, which is intermittently advanced by the mechanism shown conventionally at 18. Interconnected to this mechanism by gearing or the like, shown conventionally at 19 is a governor 20, which is so connected, as by lever connection 21, to a movable screen 17 as to insert the latter in the beam at some point between the light and the gate, here shown as between the condenser and the gate, when the mechanism is at rest and to withdraw it when the mechanism is in motion. The details of these mechanisms are quite immaterial to the present invention. A blower 22 may be utilized to blow air across the screen.

The screen consists, as has been stated, of a sheet of mica 25 upon which is formed or deposited in any way a thin layer or film of gold 26. The mica is preferably in as thin sheets as practicable. I have found a thickness of about .005 inches to be very satisfactory, but I do not in any way limit myself to that thickness. Increase in thickness, of course, increases the ruggedness of the screen and decreases the ease of heat dissipation. However, since the heat conductivity of mica is in the identical range with that of the common glasses, and since screens of the latter cannot be used with a thickness less than .04 in. and in practice are usually about .1 in. the heat will be dissipated much more rapidly from the mica even if the screen is as thick as .02. With this thickness the total heat absorption is of the same order as and is usually no greater than with ordinary glass having a thickness of .1. In this discussion it is to be understood that the heat absorption and conductivity of different specimens of mica and of different kinds of glass are not uniform but in general the heat absorption of a mica screen of useful thickness for my purposes, say .01 in. is usually less than that of a glass screen having a useful thickness, say .1 in. and since their conductivity is the same, the heat will be dissipated very much more rapidly from the mica under the same conditions.

The gold film is exceedingly thin and is measurable only by very delicate methods. The figures of different observers are inconsistent. It is most easily defined by reference to its properties. A gold film transmitting 10 per cent of the heat will transmit about 65 per cent of the light and a thickness of film of this order is what I contemplate using.

Figure 4:
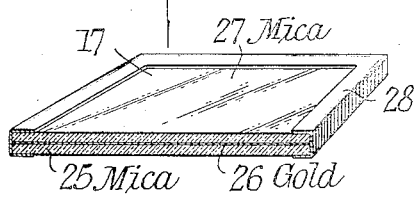
Fig. 4 is a perspective view of a screen which is also shown in section, the thicknesses of the parts being much exaggerated.

Since the gold film is very delicate, I preferably place a cover plate, also of mica, over it as shown in Fig. 4, where the mica sheets are designated 25 and 27 and the gold film 26. The screen is preferably bound at the edges with paper, metal or other suitable material as shown at 28. The thickness of each mica sheet is preferably about .004 to .005 inches, and as the thickness of the gold is negligible, the total thickness of the screen will be of the order of .008 to .010 inches. No useful purpose will be gained in making it thicker though I contemplate such thicker screens as within the scope of my invention.

Having thus described my invention, what I claim as new and desire to secure by Letters Patent is:

1. A screen for the elimination of heat rays and comprising a sheet of clear mica having a thickness of the order of .01 inches and a film of gold thereon and capable of transmitting heat rays to the order of ten per cent of heat rays incident thereon.

2. A screen for the elimination of heat rays comprising a sheet of clear mica having a thickness less than .01 inches and a film of gold adherent to one surface thereon and capable of transmitting less than 10 per cent of the heat falling upon it.

3. A screen for the elimination of heat rays comprising a film of gold and a sheet of clear mica upon each side of said gold film and in contact therewith, the total thickness of the screen being of the order of .01 inches and the screen being capable of transmitting not over ten per cent of heat rays falling upon it.

4. A motion picture projector comprising a source of light, a gate, means for moving a motion picture film through said gate, an optical system for projecting light from said source through said gate, a movable screen comprising a sheet of clear mica and a film of gold adherent to one surface thereof, and speed controlled mechanism connected to the film moving means and to the screen and operative to move the screen into and out of a position between the light and the gate.

5. A projection system comprising a source of light, a frame adapted to support a light transmitting, image carrying sheet, an optical system for projecting light from said source through said frame, and a light transmitting filter between the light and frame and comprising a sheet of clear mica, and a film of gold thereon, the total thickness of the screen being less than .02 inches.

6. A projection system comprising a source of light, a frame adapted to support a light transmitting, image carrying sheet, an optical system for projecting light from said source through said frame, and a light transmitting filter between the light and frame and close to the frame and comprising a sheet of clear mica and a film of gold thereon, the total thickness of the screen being of the order of .01 inches.

Signed at Rochester, New York, this 3rd day of December, 1926.

ARTHUR L. SCHOEN.